(12) United States Patent
Canalejo Bautista

(10) Patent No.: US 11,542,028 B2
(45) Date of Patent: Jan. 3, 2023

(54) AIRCRAFT COMPRISING AN AIR INTAKE

(71) Applicant: AIRBUS OPERATIONS S.L., Madrid (ES)

(72) Inventor: Juan Manuel Canalejo Bautista, Madrid (ES)

(73) Assignee: AIRBUS OPERATIONS S.L., Madrid (ES)

( * ) Notice: Subject to any disclaimer, the term of this patent is extended or adjusted under 35 U.S.C. 154(b) by 568 days.

(21) Appl. No.: 16/565,766

(22) Filed: Sep. 10, 2019

(65) Prior Publication Data

US 2020/0079519 A1    Mar. 12, 2020

(30) Foreign Application Priority Data

Sep. 11, 2018   (EP) .................................... 18382650

(51) Int. Cl.
*B64D 33/02* (2006.01)
*F02C 7/052* (2006.01)

(52) U.S. Cl.
CPC ........ *B64D 33/02* (2013.01); *B64D 2033/022* (2013.01); *B64D 2033/0246* (2013.01); *F02C 7/052* (2013.01)

(58) Field of Classification Search
CPC ......................... B64D 33/02; B64D 2033/0246
See application file for complete search history.

(56) References Cited

U.S. PATENT DOCUMENTS

| 2,381,705 | A | * | 8/1945 | Cecil | .......................... F02C 7/05 |
| | | | | | 55/306 |
| 2,405,102 | A | | 7/1946 | Yokes | |
| 3,411,272 | A | * | 11/1968 | Carmon | ................... F24F 13/28 |
| | | | | | 55/306 |
| 3,756,416 | A | * | 9/1973 | Wood | ...................... B01D 46/10 |
| | | | | | 55/293 |
| 4,698,078 | A | * | 10/1987 | Mavros | ................... F02M 35/04 |
| | | | | | 96/402 |
| 4,838,902 | A | | 6/1989 | Lomax | |
| 8,439,295 | B2 | * | 5/2013 | Belyew | .................. B64D 33/02 |
| | | | | | 60/39.092 |
| 9,731,831 | B2 | * | 8/2017 | Mores | ...................... F02C 7/055 |
| 2014/0260127 | A1 | | 9/2014 | Boyce | |

FOREIGN PATENT DOCUMENTS

| EP | 2 995 556 | 3/2016 |
| GB | 558088 | 12/1943 |
| WO | 2008/076471 | 6/2008 |

OTHER PUBLICATIONS

Search Report for EP 18 38 2650, dated Feb. 12, 2019, 1 page.

* cited by examiner

*Primary Examiner* — Lorne E Meade
(74) *Attorney, Agent, or Firm* — Nixon & Vanderhye P.C.

(57) ABSTRACT

An air intake including an air duct inside an aircraft, an inlet at one end of the air duct, a flap door and driving mechanism that moves the flap door between closed and open positions. The flap door includes a barrier filter configured to filter an incoming airflow into the air duct, and wherein the driving mechanism is configured to pivot the flap door about a first end of the door.

11 Claims, 9 Drawing Sheets

AIRCRAFT COMPRISING AN AIR INTAKE

RELATED APPLICATION

This application claims priority to European Patent Application EP 18382650.2, and filed Sep. 11, 2018, the entirety of which is incorporated by reference.

TECHNICAL FIELD OF THE INVENTION

The present invention belongs to the field of air intakes for aircraft onboard equipment or areas inside the aircraft and relates to an aircraft comprising an air intake comprising a barrier filter for filtering an incoming airflow and allowing cleaning such barrier filter.

BACKGROUND OF THE INVENTION

Most aircraft typically incorporate a duct system for supplying airflow to onboard equipment such as engines, electronic devices, ventilation systems, etc. or areas inside the aircraft. For example, the airflow can be drawn from the atmosphere through an air intake. Such airflow may contain unwanted materials including dust, dirt, sand, insects, hairs or lint. To prevent said unwanted materials from reaching the onboard equipment or areas inside the aircraft, the conventional aircraft intake may have a barrier filter installed.

These barrier filters can be installed in a fixed position or can be actuated to be removed from the airstream when not required (for example in flight) for avoiding impact on the intake performances (minimizing pressure losses, avoiding disturbance of the airflow, etc.). However, these known barrier filters have the problem that they can become clogged and not effective until the maintenance for cleaning or replacement is carried out. Further, the clogged barrier filters may also cause that the airflow does not reach properly the relevant onboard equipment or area inside the aircraft, resulting in low performance, malfunction and/or damage of such equipment.

Furthermore, some of the air intakes have a barrier filter arranged inside the air duct, which is the duct in charge of driving the airflow towards the onboard equipment.

There are known intakes with filters which are able to be self-cleaned on board, but with relatively complex arrangements to produce a reverse airflow for cleaning such filters and scavenge the unwanted material outside of the aircraft.

The present invention provides an aircraft with an improved air intake which solves the drawbacks previously mentioned.

SUMMARY OF THE INVENTION

In a first inventive aspect, the invention may be embodied as an aircraft comprising an air intake, the air intake comprising: an air duct arranged inside the aircraft, an inlet in one end of the air duct, a flap door, and door driver, wherein: the air intake is suitable for providing airflow through the air duct to the inside of the aircraft, the flap door is hinged in at least a first end to the inlet, the door driver are configured for moving the flap door between at least two positions, wherein said positions are: a closed position wherein the flap door closes the inlet, and an opened position wherein the flap door forms an angle with respect to the closed position of the flap door, wherein the angle is different from zero (0), wherein the flap door comprises a barrier filter configured to filter an incoming airflow into the air duct, and wherein the door driver are configured for moving the flap door from the closed position to an opened position by pivoting the flap door around the first end towards outside the aircraft and towards the rear part of the aircraft.

The present aircraft comprises an air intake with an air duct comprising two ends. The air duct is adapted for driving an incoming airflow to the inside of the aircraft, particularly, is adapted for driving an incoming airflow to an onboard equipment or area inside the aircraft, for example to an aircraft engine. Throughout this entire document, it will be understood that one of the ends of the air duct (the inlet) is located in contact with the outside the aircraft to draw air from the atmosphere, and the other end of the air duct is located inside the aircraft. In a particular embodiment, the inlet of the air intake is arranged on the surface of the aircraft.

The air intake is suitable for providing an incoming airflow through the air duct to the inside of the aircraft. In addition, when the aircraft is moving forward (e.g. in flight phase), an external airflow circulates on the surface of the aircraft from the front part (nose) of the aircraft to the rear part (tail cone) of the aircraft; an external airflow can also circulate on the surface of aircraft in different directions not because of the aircraft movement but due to other sources (i.e. propellers, rotors, engine jets, wind, etc.).

The flap door of the air intake is a door which can be flapped by the actuation of the door driver both when the aircraft is in flight and during operations on ground. The door driver may be implemented for example as a combination of one or more pulleys, shafts, gears, belts, levers, rods, actuators, motors or any other mechanism actuated by any given energy source (electric, chemical, pneumatic, hydraulic, thermal, solar, . . . ) to give motion to the flap door. The door driver are configured to be remotely operated by a control system from the outside of the aircraft when it is on ground, or from inside the aircraft when the aircraft is on ground or in flight, for example from the cockpit.

The door driver may be configured to move the flap door between an opened position and a closed position. The closed position is understood as the position wherein the flap door covers completely the inlet cross-sectional area, particularly the end of the air duct which is in contact with the outside of the aircraft. That is to say, when the flap door is in the closed position, said flap door is faced by one side (the outer side) towards outside the air duct and outside the aircraft, and by an opposite side (the inner side) it is faced towards inside the air duct. In contrast, the opened position is understood as the position wherein the flap door is arranged at a position different from the closed position, towards outside the air duct, or towards inside the air duct. Thus, through this document, the expression "outside the air duct" will be understood as outside the aircraft, and the expression "inside the air duct" will be understood as inside the aircraft. Advantageously, the present air intake can be opened or closed by the actuation of the door driver on the flap door. In the closed position of the flap door, materials such as sand and dust from the incoming airflow are filtered by the barrier filter comprised in the flap door. The closed position is preferably used on ground or in flight at low altitudes when the filtering is needed, or to avoid foreign object damage and/or to minimize impact on external aerodynamic performance of the aircraft, i.e. drag.

The opening and closing of the inlet of the air intake may be achieved by pivoting the flap door around the first end hinged to the inlet. Particularly, the flap door pivots around its first end towards outside the aircraft and towards the rear part of the aircraft for passing from a closed position to an opened position. Furthermore, in an embodiment, the flap door additionally pivots around its first end towards inside the air duct and towards the rear part of the aircraft for passing from a closed position to an opened position wherein the flap door is arranged inside the air duct.

While the flap door is in its closed position, the flap door is contained in a first plane; and when the flap door is in its opened position, the flap door is in a second plane different to the first plane. Thus, the door driver can control the angle that forms the flap door when it is in its opened position relative to the first plane.

The flap door of the air intake comprises a barrier filter embedded in it in such a way that when the flap door is in the closed position the barrier filter is arranged on at least part of the inlet cross-sectional area of the air intake. The barrier filter has a plurality of pores, allowing the airflow to pass through it, but preventing particles in suspension such as dust, dirt, sand, pollen, mould, bacteria, insects or lint, from penetrating the barrier filter. Advantageously, such barrier filter is designed to retain such unwanted materials with a specific efficiency, thus preventing such unwanted material from damaging onboard equipment components or impinging an area inside the aircraft. Further, the barrier filter allows the clean incoming airflow (airflow without unwanted materials) passing through the barrier filter towards inside the air duct, thus achieving the desired function in the onboard equipment and/or in the area inside the aircraft, i.e. ventilation, conditioning.

Furthermore, the barrier filter is also designed with a specific capacity to accumulate unwanted materials without impacting significantly on the intake performances during a certain period of time, but eventually the barrier filter of the air intake advantageously can be self-cleaned thanks to the opened position of the flap door, wherein the flap door is placed towards outside of the air duct, so that an external airflow arriving on the inner side of the barrier filter, goes through the barrier filter in a reverse direction and causes the unwanted material retained in the barrier filter to be released through the outer side. The self-cleaning of the barrier filter is preferably performed in flight. However, the self-cleaning of the barrier filter can be also performed if an external airflow already exists not because of the aircraft movement but from other external sources (i.e. propellers, rotors, wind, etc.).

Two airflows are defined as an incoming airflow and an external airflow. The incoming airflow will be understood as the airflow that goes inward the air duct, so that when the flap door is in the closed position, the incoming airflow is filtered passing through the barrier filter in a normal direction, whereas when the flap door is in the opened position, the incoming airflow goes inward the air duct without being filtered. On the other hand, the external airflow will be understood as the airflow that goes along the external surface of an aircraft (for example in flight); so that when the flap door is in the opened position towards the outside of the air duct, the external airflow goes through the barrier filter in a reverse direction drawing out the unwanted material retained in the barrier filter.

Therefore, the present invention may be embodied to provide an aircraft with an improved air intake with a simplified mechanism for filtering the incoming airflow in the normal direction and cleaning the barrier filter with an external airflow in the reverse direction drawing the unwanted material out of the aircraft. Furthermore, thanks to the capability of self-cleaning the barrier filter, there is no need to ensure aircraft performance with unwanted material accumulated cycle after cycle until the end of its life cycle, since the barrier filter can be easily cleaned every flight cycle, thus allowing to reduce weight and size of the barrier filter, minimizing also its impact on performance In a particular embodiment, the barrier filter comprises a first side (outer side) faced outward the air duct when the flap door is in the closed position, and a second side (inner side) faced inward the air duct when the flap door is in the closed position. When the flap door is in the closed position, a first side of the barrier filter is faced outward the air duct so that when there is an incoming airflow passing through the barrier filter such airflow first penetrates the first side of the barrier filter and then passes through the barrier filter coming out through the second side of the barrier filter. Pass of the airflow from the first side to the second side of the barrier filter shall be understood herein as "normal direction". When the flap door is in the closed position, the unwanted material will be retained within the barrier filter. When the flap door is in the opened position towards outside the aircraft it is arranged such that an existing external airflow will pass through the barrier filter in a reverse direction, i.e. penetrating first the second side (inner side) of the barrier filter thus releasing the unwanted material which was retained through the first side (outer side) of the barrier filter. That is, when the flap door is opened and arranged outside the aircraft, the second side of the barrier filter is faced to the external airflow coming from the front part of the aircraft to the rear part of the aircraft.

In a particular embodiment, the barrier filter comprise at least one filter. In a particular embodiment, the barrier filter comprise a plurality of filters. In an embodiment, two or more filters are arranged one followed by another and substantially parallel one to another.

In a particular embodiment, the air intake comprises at least one movable blind and actuator, wherein the actuator are configured for moving at least one movable blind to two positions: a blocking position wherein the movable blind covers the barrier filter, and a non-blocking position wherein the movable blind uncovers the barrier filter. In this document, the blocking position of the movable blind will be understood as the position where the barrier filter are covered by the movable blind, in other words, the airflow cannot penetrate the barrier filter. In contrast, the non-blocking position of the movable blind will be understood as the position where the movable blind allows the airflow to penetrate the barrier filter.

In a particular embodiment, one movable blind is arranged on the flap door and comprises a plurality of slats. In a preferred embodiment each slat is attached in an articulated way to the flap door by one end of the slat. In this particular embodiment, the slats are rotatably fixed to one of the two sides of the barrier filter by one of their ends which will be understood as an articulated end while the other end will be understood as the free end. In this embodiment, the action of the airflow on the flap door, for example when such airflow goes through the barrier filter, causes each slat of the movable blind to rotate around its articulated end, putting the movable blind in the blocking or the non-blocking position. Further, the action of actuator on the movable blind causes each slat of the movable blind to rotate around its articulated end, thereby putting the movable blind in the blocking or the non-blocking position.

Therefore, the present invention may be embodied to provide an aircraft comprising an air intake with a particular movable blind that can be actuated by the airflow in some cases, such that in said cases it is not necessary the actuation of the actuator.

In a particular embodiment, at least one movable blind is located at the first side of the barrier filter or at the second side of the barrier filter.

In a particular embodiment, the barrier filter comprises at least two filters and one movable blind is located between filters.

In a particular embodiment the slats are arranged at the first side (outer side) of the barrier filter and are configured such that when the flap door is opened towards outside the air duct the slats are movable to the non-blocking position by the action of the external airflow and are movable to the blocking position by the actuator, and when the flap door is closed the slats are movable to the non-blocking position towards outside the air duct by the actuator. In an embodiment the actuator comprises a cam mechanism.

In another particular embodiment the slats are arranged at the second side (inner side) of the barrier filter and are configured such that when the flap door is opened the slats are movable to the non-blocking position by the actuator and are movable to the blocking position by the external airflow, and when the flap door is closed, the slats are movable to the non-blocking position by the incoming airflow, further the slats are configured to be movable to the blocking position by the actuator. In an embodiment the actuator comprises a cam mechanism.

In an embodiment of the air intake each slat is rotatably fixed to the flap door, such that each slat is configured to be rotated around an axis by the actuation of the actuator, and the barrier filter comprises a plurality of first filter portions, wherein each first filter portion is hingedly attached to two contiguous slats and can be pleated in at least two parts. In this embodiment the rotation of the slats around the axis causes the articulated movement of the first filter portions. Preferably, the axis is parallel to the longitudinal axis of the slats. In a preferred embodiment the barrier filter comprises a plurality of second filter portions, wherein each second filter portion can be pleated in at least two parts and is hingedly attached to two contiguous slats at an end of the slats opposed to the end where the first filter portions are attached, and wherein the rotation of the slats around the axis causes the articulated movement of the second filter portions.

In an embodiment the slats are co-actuated together with the flap door, for example using a cam mechanism. Also, the slats may be loose in certain conditions to allow the airflow set the slats in the desired position for each mode of operation of the flap door (i.e. guiding airflow across the flap door on filtering or cleaning mode, flattened against the barrier filter in a scoop mode as described hereafter).

In a particular embodiment, one movable blind is hinged to the inlet. The movable blind hinged to the inlet is configured to block or allow the airflow penetrating through the barrier filter and/or through the inlet, by the actuation of actuator.

In a particular embodiment the door driver are configured for moving the flap door to two opened positions, the two opened positions being: a cleaning position wherein the flap door forms a first angle with respect to the closed position of the flap door; and a scoop position wherein the flap door forms a second angle with respect to the closed position of the flap door, wherein in both cleaning and scoop position the flap door is arranged towards outside the air duct.

In the cleaning position the flap door allows the external airflow to pass through the barrier filter in reverse direction. In the scoop position the flap door is placed such that it guides the airflow into the air duct.

The cleaning position is understood as the opened position of the flap door towards outside the air duct wherein the barrier filter is self-cleaned by the actuation of the external airflow when the flap door is arranged towards outside the air duct and said airflow penetrates such barrier filter in reverse direction. Advantageously, such cleaning position allows the barrier filter to be self-cleaned by the actuation of the external airflow in flight. Further, the cleaning position is characterized in that the flap door is open enough so that the external airflow can pass through the barrier filter cleaning all the unwanted material retained within the barrier filter and drawing it outside of the aircraft through the barrier filter. In the embodiment wherein the air intake comprises at least one movable blind, the cleaning mode is understood as the cleaning position of the flap door wherein the movable blind is in its non-blocking position.

The scoop position is understood as the opened position of the flap door wherein the flap door is arranged towards the outside of the air duct and wherein not all the airflow can go through the barrier filter, in such a way that at least part of the airflow is guided towards inside the air duct of the air intake. In an embodiment wherein the air intake comprises at least one movable blind, the scoop mode is understood as the scoop position of the flap door wherein the movable blind is in its blocking position. Alternatively or additionally, the barrier filter may have an anisotropic porosity, such that the portion of airflow which passes through the barrier filter depends on the direction of the external airflow arriving at the barrier filter. Advantageously, such scoop position allows the airflow to be driven towards inside the air duct by the actuation of the flap door in flight. In addition, the scoop position advantageously provides an increase of pressure recoveries at the aircraft inlet.

In a particular embodiment, the actuator are configured for moving at least one movable blind to the non-blocking position when the flap door is in the cleaning position.

In a particular embodiment, the actuator are configured for moving at least one movable blind to the blocking position when the flap door is in the scoop position.

Cleaning and scoop positions of the flap door may be the same or may be defined having different angles. In an embodiment the first angle is equal to the second angle. In another embodiment the second angle is different to the first angle. In another embodiment the first angle is smaller than the second angle. In this embodiment the angle between the flap door and a closed position of the flap door of the air duct is smaller in the cleaning position, thus minimizing drag but ensuring proper cleaning, and the angle is greater in the scoop position to maximize pressure recoveries.

The positions of the flap door may be fixed or may be controlled to optimize performances as a function of the flight conditions, such as aircraft speed, altitude, etc.

The movable blind may be also actuated to be in the blocking position when the flap door is in the closed position to seal completely the air intake when an incoming airflow is not required.

In an embodiment the door driver are configured for moving the flap door to a fallback position, wherein the flap door forms a third angle with respect to the closed position of the flap door, the third angle being different to the first and the second angle. Preferably, in the fallback position the flap door is located within the air duct or out of the air duct.

The fallback position is understood as an opened position of the flap door wherein the incoming airflow can penetrate into the air duct and the external airflow does not cross the flap door. In an embodiment, in the fallback position the flap door is fully opened flattened with an external aircraft surface or fully opened inwards the air duct, flattened with an inner intake wall. Advantageously, the fallback position avoids impact on intake performance and aircraft drag in case of damage, failure and/or malfunction.

In a particular embodiment, in the cleaning position the flap door forms a first angle with respect to the closed position of the flap door, in the scoop position the flap door forms a second angle with respect to the closed position of the flap door, and in the fallback position the flap door forms a third angle with respect to the closed position of the flap door.

In a particular embodiment, the flap door is double hinged in a first and a second end to the inlet and the door driver are configured for moving the flap door from the closed position to a fallback position by pivoting the flap door around the second end towards inside the air duct and towards the front part of the aircraft. More particularly, in this embodiment the flap door can be articulated about the first end or the second end for its opening. The first end of the flap door is closer to the rear part of the aircraft than the second end whilst the second end of the flap door is closer to the front part of the aircraft than the first end. Thus, when the flap door is moved towards inside the aircraft and towards the front part of the aircraft, such flap door pivots around the second end.

All the features described in this specification (including the claims, description and drawings) and/or all the steps of the described method can be combined in any combination, with the exception of combinations of such mutually exclusive features and/or steps.

DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION OF THE INVENTION

FIGS. 1A and 1B and FIGS. 2 to 6 schematically show air intakes (1) connected to an onboard equipment or area inside an aircraft (9) according to several embodiments. In these figures, the onboard equipment is an aircraft engine (10).

Figures 1A, 1B:
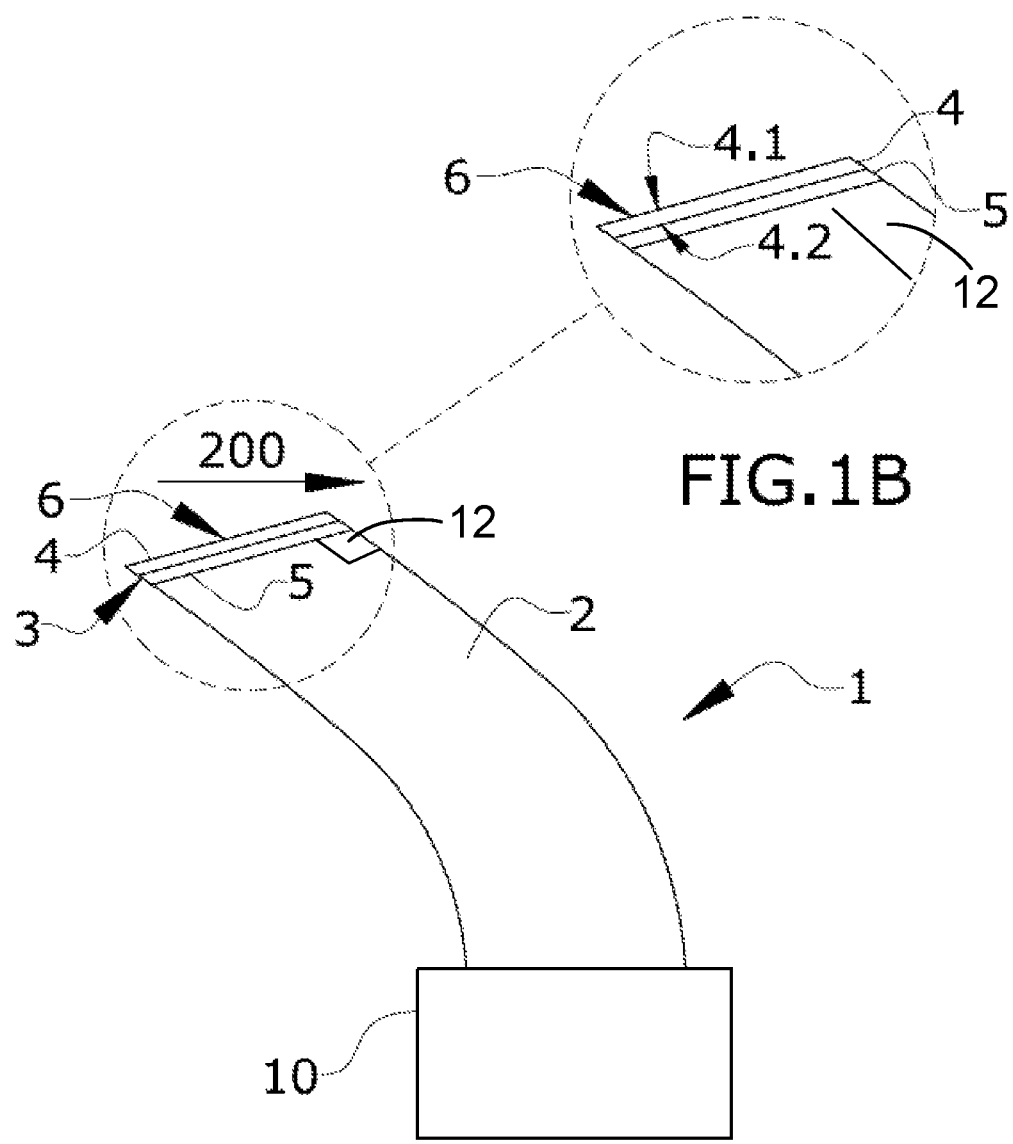
FIGS. 1A-1B show an air intake of an aircraft according to an embodiment of the present invention.

FIG. 1A schematically shows an air intake (1) of an aircraft (9) according to an embodiment of the present invention. The air intake (1) comprises an air duct (2), an inlet (6), a flap door (3) and door driver (12). The flap door (3) comprises a barrier filter (4) configured to filter an incoming airflow (not shown) into the air duct (2). The air intake (1) is suitable for providing airflow through the air duct (2) to an engine (10) of the aircraft (9).

The door driver (12) is configured for moving the flap door (3) between at least a closed position and an opened position. In the closed position the flap door (3) closes the inlet (6) of the air intake (1) at one end of the air duct (2). At the opened position the flap door (3) forms an angle with respect to the closed position of the flap door (3), wherein the angle is different from 0. FIG. 1A shows the air intake (1) in a closed position of the flap door (3). The door driver (12) may be a conventional mechanical mechanism for opening a door or flap, such as an electrically driven motor with a gear assembly which turns a shaft fixed to an end of the flap door to open and close the flap door.

The air intake (1) of an aircraft according to this embodiment further comprises one movable blind (5) at the flap door (3), wherein the movable blind (5) has at least a blocking position and a non-blocking position. In the blocking position the movable blind (5) covers the barrier filter (4), thus blocking the pass of airflow through the barrier filter (4). In the non-blocking position the movable blind (5) uncovers the barrier filter (4), thus allowing the pass of airflow through the barrier filter (4). In the embodiment of FIG. 1A the movable blind (5) is in the blocking position and thus stops the incoming airflow from entering the air intake (1). FIG. 1A also shows an external airflow (200).

FIG. 1B shows an enlarged detail of the flap door (3) of the air intake (1) of FIG. 1A. FIG. 1B shows a first side (4.1) (outer side) and a second side (4.2) (inner side) of the barrier filter (4). The first side (4.1) of the barrier filter (4) is the side faced outward the air duct (2) when the flap door (3) is in the closed position. The second side (4.2) of the barrier filter (4) is the side faced inward the air duct (2) when the flap door (3) is in the closed position. Thus, when the flap door (3) is in the closed position, as shown in FIGS. 1A and 1B, and the movable blind (5) is in the non-blocking position, the unwanted material flowing with the incoming airflow will be retained in the first side (4.1) of the barrier filter (4) and/or within the barrier filter (4). In the embodiment shown in FIG. 1A the movable blind (5) is arranged at the second side (4.2) of the barrier filter (4).

Figure 2:
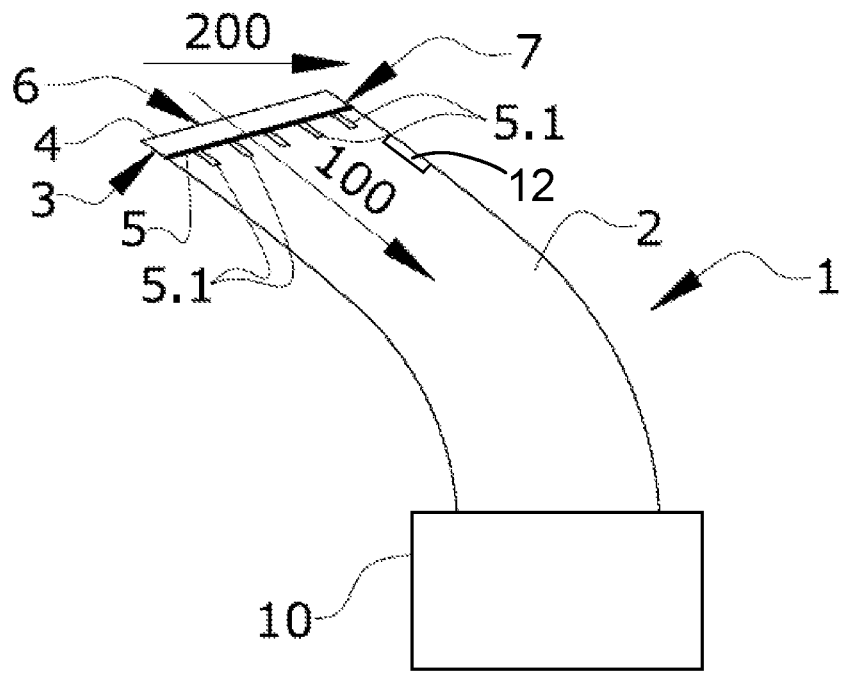
FIG. 2 shows an air intake of an aircraft according to an embodiment of the present invention.

FIG. 2 schematically shows an air intake (1) of an aircraft (9) according to an embodiment of the present invention. The air intake (1) comprises an air duct (2), a flap door (3) and door driver (12). The flap door (3) is hinged at a first end (7) to the inlet of the air duct. The flap door (3) comprises a barrier filter (4) configured to filter an incoming airflow (100) into the air duct (2). The air intake according to this embodiment comprises a movable blind (5) arranged at the second side (4.2) of the barrier filter (4). In this embodiment the movable blind (5) comprises a plurality of slats (5.1).

Each slat is attached in an articulated way to the flap door (3) by one end of the slat (5.1). In this particular embodiment, the slats are rotatably fixed to the second side (4.2) of the barrier filter (4) by one end of the slats (3) which will be understood as an articulated end, while the opposite end of the slats (3) will be understood as a free end.

In this figure, the air intake (1) is shown with the flap door (3) in a closed position. In this embodiment, the action of the incoming airflow (100) on the flap door (3), when such airflow (100) goes through the barrier filter (4) in a normal direction, causes the slats (5.1) of the movable blind (5) to rotate around their articulated ends, driven by the incoming airflow (100), putting the movable blind (5) in the non-blocking position. Thus, FIG. 2 shows the air intake (1) in a filtering mode, where the incoming airflow (100) entering the air intake is filtered by the barrier filter (4) in the normal direction. In this embodiment, the air intake (1) comprises an actuator (13) configured to move the movable blind (5) to the blocking position.

Figure 3:
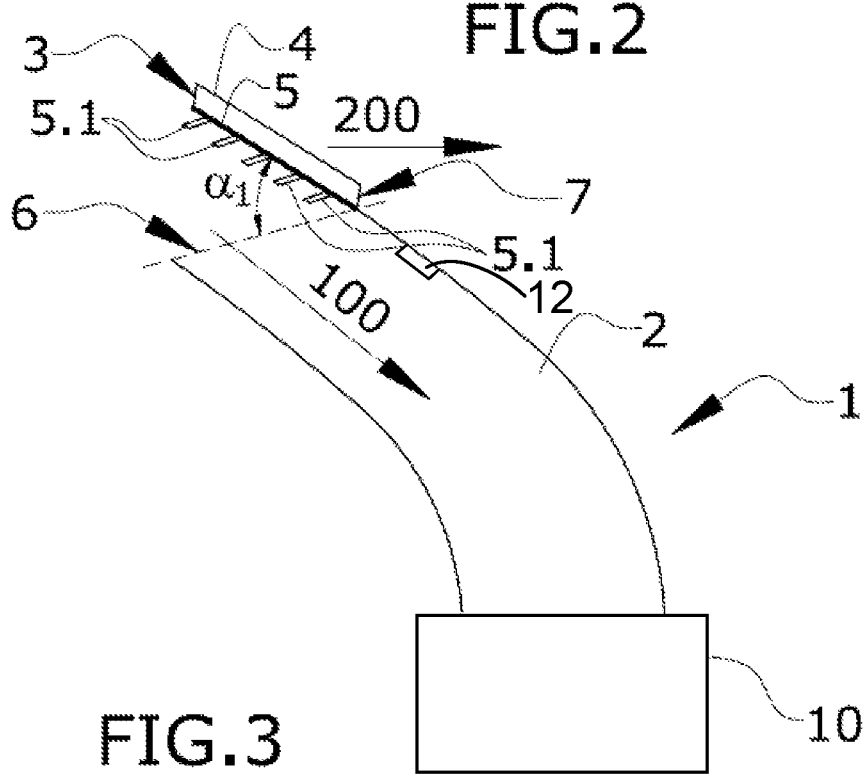
FIG. 3 shows an air intake of an aircraft according to the embodiment of FIG. 2.

FIG. 3 schematically shows the air intake of the embodiment of FIG. 2 in a cleaning position. The cleaning position is an opened position of the flap door (3), wherein the flap door (3) forms a first angle (α1) with respect to the closed position of the flap door (3). In addition, in this figure the movable blind (5) is in its non-blocking position. The closed position of the flap door (3) is represented in FIG. 3 with a dashed line in order to better identify the first angle (α1). In this figure the slats (5.1) are placed in a position such that the external airflow (200) is allowed to pass through the barrier filter (4) in a reverse direction. Actuator, such as a cam mechanism, are configured to control the position of the slats (5.1) in this embodiment. In this position of the flap door (3) external airflow (200) going through the barrier filter (4) in the reverse direction removes the unwanted material retained within the barrier filter (4).

The flap door (3) of the air intake (1) passes from the closed position shown in FIG. 2 to the cleaning position (opened position) shown in FIG. 3 by pivoting around the first end (7) towards outside the air duct (2) and towards the rear of the aircraft (9). That is, the flap door (3) pivots towards the direction of the external airflow (200).

Figure 4:
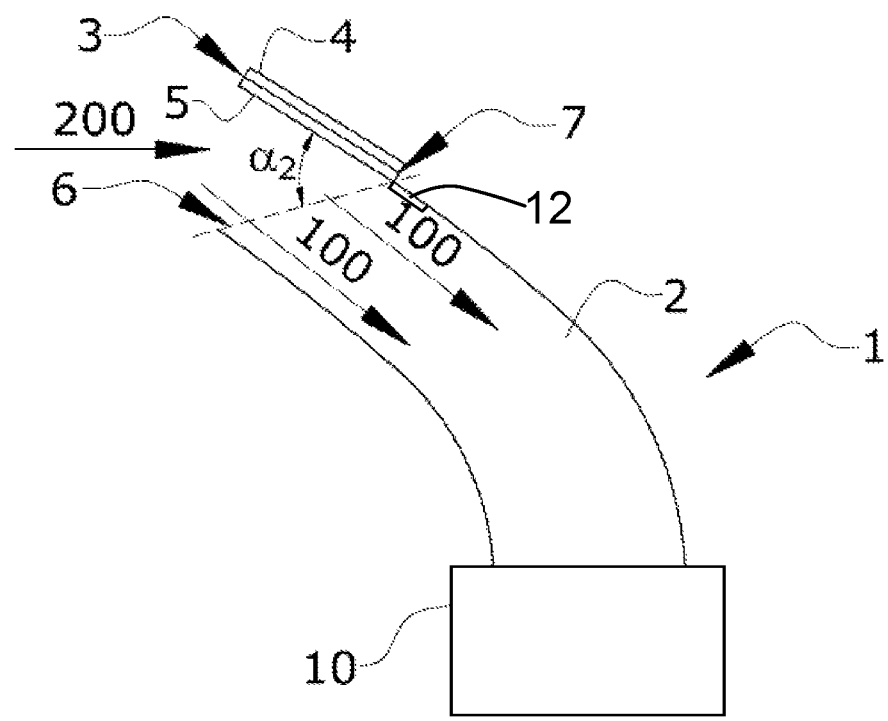
FIG. 4 shows an air intake of an aircraft according to the embodiment of FIGS. 2 and 3.

FIG. 4 schematically shows the air intake of the embodiment of FIGS. 2 and 3 in a scoop position. The scoop position is an opened position of the flap door (3), wherein the flap door (3) forms a second angle (α2) with respect to the closed position of the flap door (3) and wherein the movable blind (5) is in its blocking position. The closed position of the flap door (3) is represented in FIG. 4 with a dashed line in order to better identify the second angle (α2). In this figure the slats (5.1) are placed such that they cover the barrier filter (4), thus blocking the pass of external airflow (200) through the barrier filter (4) of the flap door (3). In this embodiment the external airflow (200) sets the slats (5.1) in a position flatted against the barrier filter (4). Also, the slats (5.1) can be set in this position by the actuator (13). In the scoop position the external airflow (200) is guided by the flap door (3) towards inside the air duct (2) of the air intake (1), as incoming airflow (100), thus increasing pressure recoveries at the engine (10) inlet.

In an embodiment the first angle (α1) is smaller than the second angle (α2). In other words, the position of the flap door (3) in the cleaning mode is less open than the position of the flap door (3) in the scoop mode. In other embodiments, the first angle (α1) may be equal to or greater than the second angle (α2).

Figure 5:
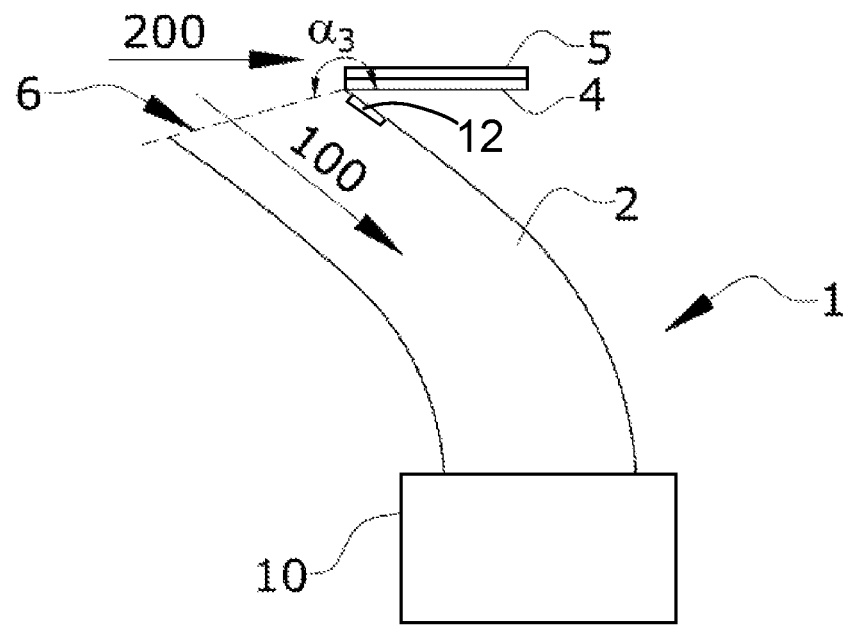
FIG. 5 shows an air intake of an aircraft according to the embodiment of FIGS. 2 to 4.
Figure 6:
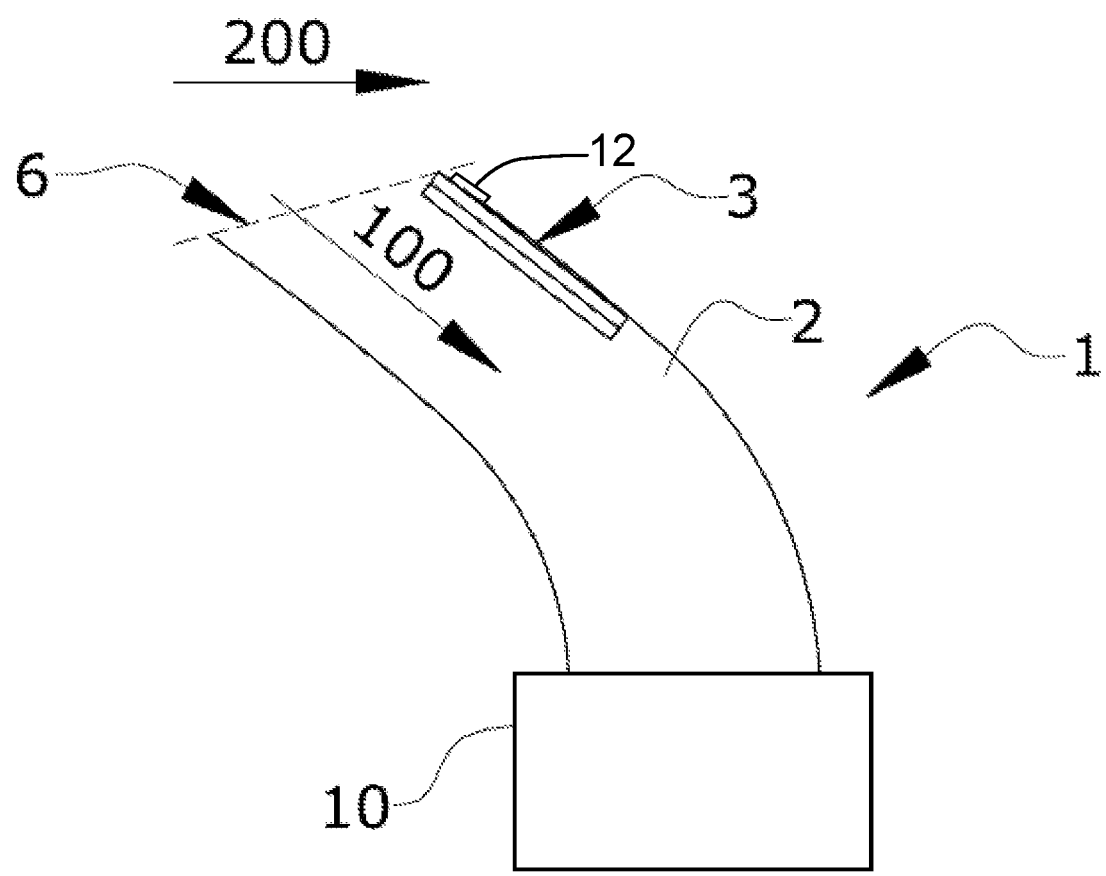
FIG. 6 shows an air intake of an aircraft according to the embodiment of FIGS. 2 to 5.

FIGS. 5 and 6 schematically show the air intake (1) of the embodiment of FIGS. 2 to 4 in a fallback position. The fallback position in FIG. 5 is a position wherein the flap door (3) is set flattened with the external aircraft (9) surface (not shown), whereas in FIG. 6 is a position wherein the flap door (3) is located within the air duct (2). The fallback position avoids impact on intake performance and aircraft drag in case of clogging, damage, failure and/or malfunction, minimizing the potential disturbance on both incoming (100) and external (200) airflows. The fallback position is an opened position of the flap door (3), wherein the flap door (3), hinged in a first end (7) to the inlet (6), forms a third angle (α3) with respect to the closed position of the flap door (3) and wherein the movable blind (5) can be in its blocking or non-blocking position (allowing potential blockage/malfunction). The closed position of the flap door (3) is represented in FIGS. 5 and 6 with a dashed line in order to better identify the third angle (α3).

The flap door (3) of the air intake (1) passes from the closed position shown in FIG. 2 to the fallback position (opened position) shown in FIG. 5 by pivoting around the first end (7) of the flap door (3) towards outside the air duct (2) and towards the rear of the aircraft (9). That is, the flap door (3) pivots towards the direction of the external airflow (200).

The flap door (3) of the air intake (1) passes from the closed position shown in FIG. 2 to the fallback position (opened position) shown in FIG. 6 by pivoting around the first end (7) of the flap door (3) towards inside the air duct (2) and towards the rear of the aircraft (9).

Figure 7:
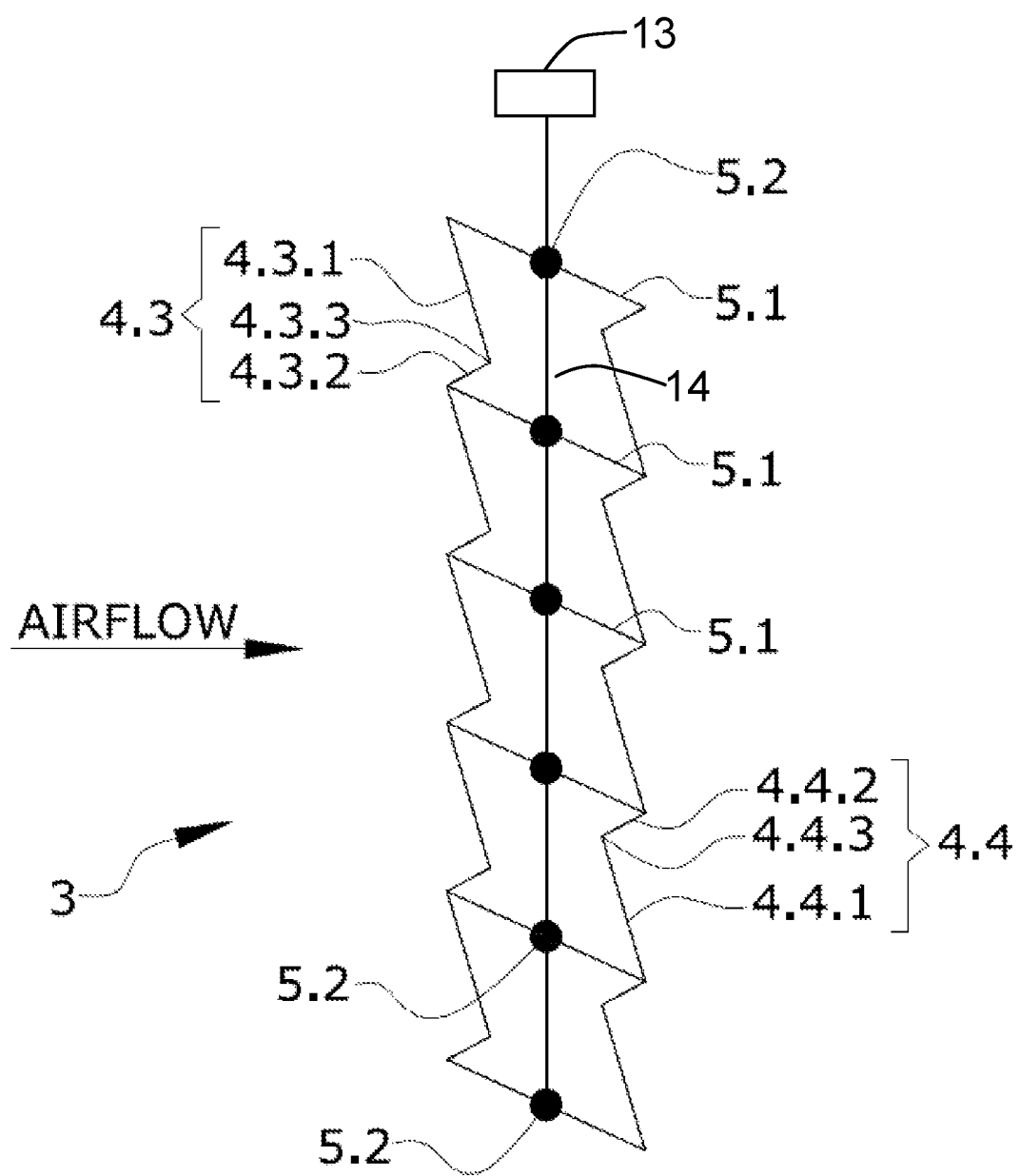
FIG. 7 shows a flap door of an air intake of an aircraft according to an embodiment of the present invention.

FIG. 7 shows a flap door (3) of an air intake (1) of an aircraft (9) according to a particular embodiment. In this embodiment, the flap door (3) comprises a movable blind (5) comprising a plurality of slats (5.1). Each slat (5.1) is rotatably fixed to the flap door (3) at an axis (5.2). Each slat (5.1) can be rotated around the axis (5.2) by the actuation of the actuator (13). The axis (5.2) around which the slats (5.1) rotate are contained in a plane which will be named "axis plane". The actuator (13) may be an electrical motor that turns a shaft (14) aligned with the axis (5.2). The shaft (14) supports that slats.

In this embodiment, the flap door (3) also comprises a plurality of first filter portions (4.3) and second filter portions (4.4). Each first filter portion (4.3) is hingedly attached to two contiguous slats (5.1) and is foldable in two parts (4.3.1, 4.3.2) forming between said parts a first articulation (4.3.3); and each second filter portion (4.4) is foldable in two parts (4.4.1, 4.4.2) forming between said parts a second articulation (4.4.3) and is hingedly attached to two contiguous slats (5.1) at an end of the slats opposed to the end where the first filter portions (4.3) are attached. In this embodiment, there are a plurality of first filter portions (4.3) arranged on one side of the axes plane and a plurality of second filter portions (4.4) arranged on the other side of such axes plane. Thus, according to the configuration of the flap door (3) of this embodiment, the rotation of the slats (5.1) around the axes (5.2) causes the articulated movement of the first filter portions (4.3) and the second filter portions (4.4). This articulated movement defines a blocking and a non-blocking position of the movable blind (5).

FIG. 7 schematically shows the flap door (3) with the movable blind (5) in a non-blocking position. As it can be observed, the slats (5.1) are rotated around the axes (5.2) in a coordinate way in such a way that an incoming (100) and/or external (200) airflow can pass through the flap door (3) being filtered when it sequentially goes through the first (4.3) and second (4.4) filter portions. In contrast, if the slats (5.1) are rotated in such a way that both of their ends are next to the axes plane, such slats (5.1) block the airflow (100, 200) from passing through the filter portions (4.3, 4.4) (this blocking position is not shown).

FIGS. 8 to 13 schematically show an air intake (1) of an aircraft (9) according to an embodiment of the present invention for supplying airflow to an onboard equipment or area inside an aircraft (9), such as an aircraft engine (10). The air intake (1) comprises an air duct (2), an inlet (6), a flap door (3), at least one movable blind (5), door driver (12) and an actuator (13). The flap door (3) comprises a barrier filter (4) configured to filter an incoming airflow (100) into the air duct (2). The air intake (1) is adapted for providing airflow through the air duct (2). In this embodiment the flap door (3) is hinged at a first end (7) and at a second end (8) to the inlet (6), wherein the first end (7) is located closer to the rear of the aircraft (9) than the second end (8), and the second end is closer to the front part of the aircraft (9) than the first end. The movable blind (5) is hinged to the inlet (6) and is configured as a panel adapted to cover the barrier filter (4). These FIGS. 8-14 also show an external airflow (200).

The door driver (12) is configured for moving the flap door (3) between at least a closed position and an opened position. In the closed position the flap door (3) closes the inlet (6) of the air intake (1) at one end of the air duct (2) (shown in FIGS. 8-9). At the opened position the flap door (3) is opened towards outside of the air duct (2) (shown in FIGS. 10-11) or towards inside of the air duct (2) (shown in FIG. 12).

The actuator (13) is configured for moving the movable blind (5) between at least a blocking position and a non-blocking position. In the blocking position the movable blind (5) covers the barrier filter (4), thus blocking the pass of incoming airflow (100) from outside into the air intake (1). In the non-blocking position the movable blind (5) uncovers the barrier filter (5), thus allowing incoming airflow (100) into the air intake (1).

Figure 8:
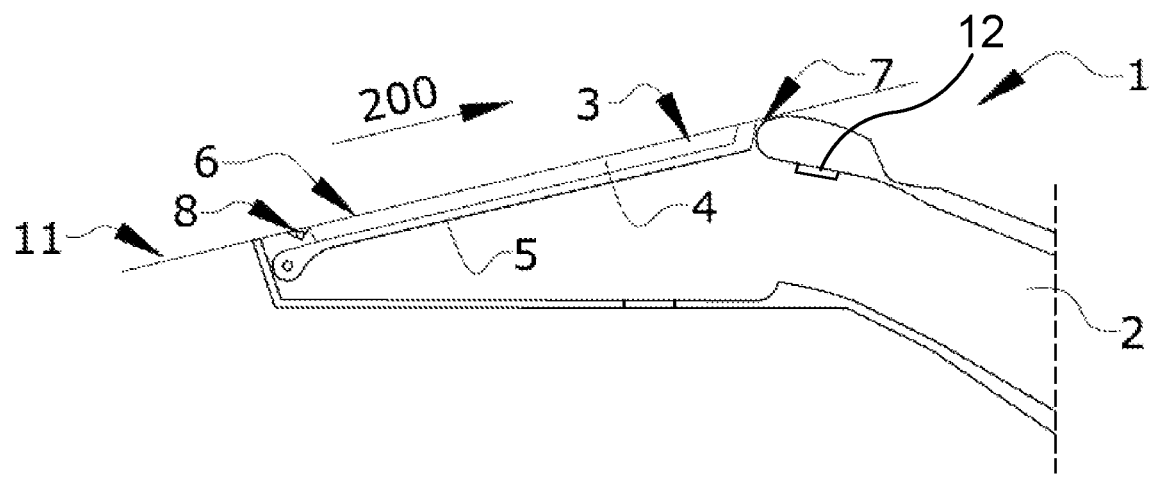
FIG. 8 shows an air intake of an aircraft according to the embodiment of FIG. 7.

In these FIGS. 8-13 the inlet (6) is arranged in the surface (11) of the aircraft (9) in such a way that when the flap door (3) closes the inlet (6) as it can be observed in FIG. 8, the external side (the first side (4.1) of the barrier filter) of the flap door (3) is a continuation of the surface (11) of the aircraft (9).

In FIG. 8 the flap door (3) is in the closed position and the movable blind (5) is in the blocking position and thus stops the incoming airflow from entering the air intake (1). Thus, in in FIG. 8 the inlet (6) of the air intake (1) is closed and blocked, for example corresponding to a situation where the aircraft engine is off.

Figure 9:
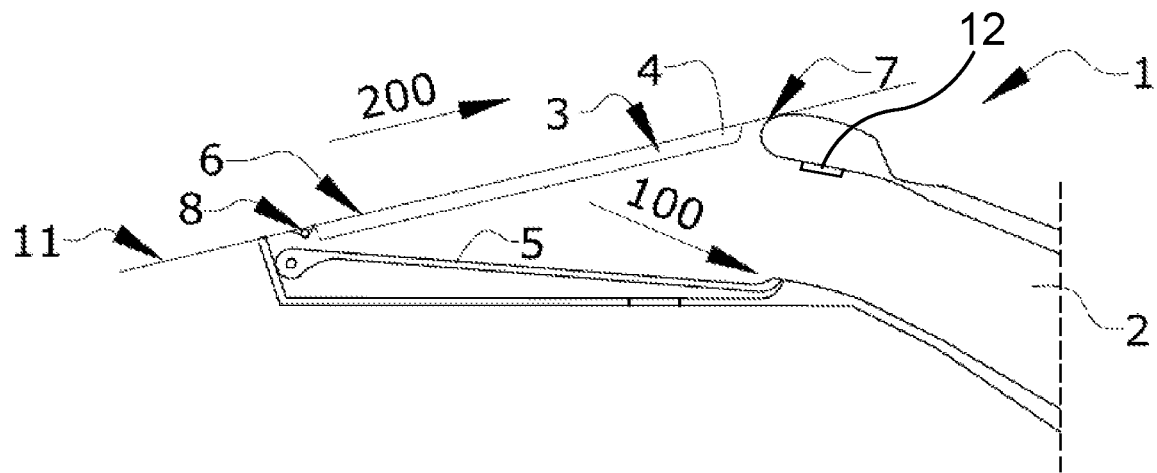
FIG. 9 shows an air intake of an aircraft according to the embodiment of FIGS. 7 and 8.

FIG. 9 schematically shows the air intake (1) of FIG. 8 in a different situation.

In this figure, the air intake (1) of the aircraft (9) is shown with the flap door (3) in a closed position and with the movable blind (5) in a non-blocking position, namely moved towards inside the air duct (2). In FIG. 9 it is shown how the incoming airflow (100) goes through the barrier filter (4) of the flap door (3), and said incoming airflow (100) is driven towards inside the air duct (2). Thus, FIG. 9 shows the air intake (1) in a filtering mode, where the incoming airflow (100) entering the air intake (1) is filtered by the barrier filter (4). In this embodiment, the air intake (1) comprises an actuator (13) configured for putting the movable blind (5) towards inside the air duct (2) in a non-blocking position. The actuator (13) may be conventional such as a In the filtering mode shown in FIG. 9, the flap door (3) is in its closed position allowing the incoming airflow (100) being filtered, for example in a situation when the aircraft engine (10) is on.

Figure 10:
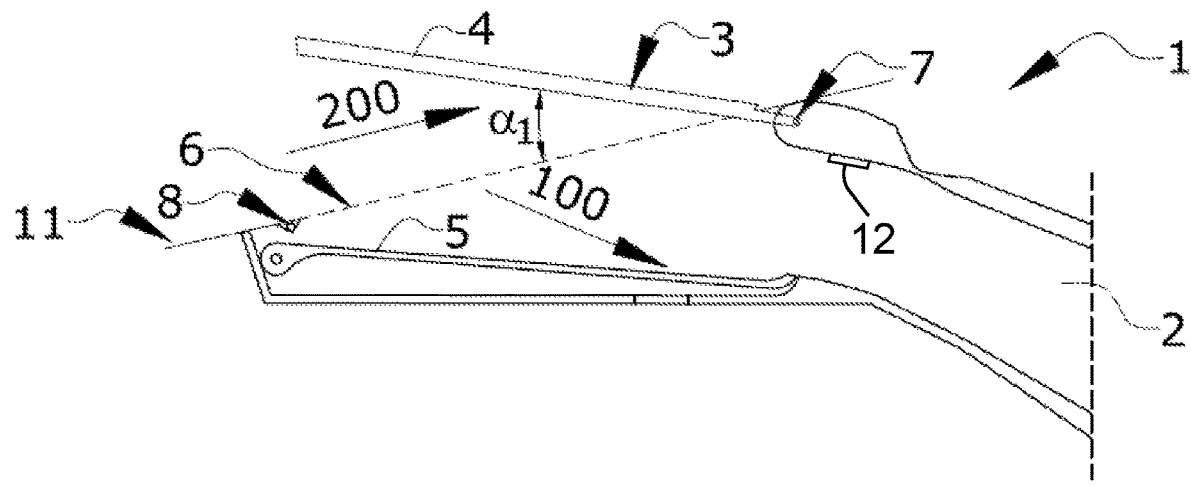
FIG. 10 shows an air intake of an aircraft according to the embodiment of FIGS. 7 to 9.

FIG. 10 schematically shows the air intake (1) of the embodiment of FIGS. 8 and 9 in a cleaning position. The cleaning position is an opened position of the flap door (3), wherein the flap door (3) is articulated about the first end (7) and forms a first angle ($\alpha 1$) with respect to the closed position of the flap door (3). In addition, in this figure the movable blind (5) is in its non-blocking position and arranged towards inside the air duct (2). The closed position of the flap door (3) is represented in FIG. 10 with a dashed line in order to better identify the first angle ($\alpha 1$). In this figure it can be observed that the external airflow (200) is going through the barrier filter (4) in a reverse direction. The actuator (13) is are configured to control the position of the movable blind (5). In this embodiment, the actuator (13) may be a cam mechanism driven by an electrical motor. In this position of the flap door (3) external airflow (200) going through the barrier filter (4) removes the unwanted material retained within the barrier filter (4).

In the cleaning mode shown in FIG. 10, the flap door (3) is in its opened position allowing the external airflow (200) go through the barrier filter (4) of the flap door (3) in a reverse direction, drawing the unwanted material out of the aircraft.

In another embodiment, the barrier filter may be also cleaned using a reverse airflow coming from inside the aircraft when the incoming airflow is not required, for example in a situation when the aircraft engine is off. In this embodiment, the flap door is in its closed position in such a way that said reverse airflow goes through the barrier filter from inside to outside of the air duct, allowing the unwanted material to be wiped downstream by the external airflow.

Figure 11:
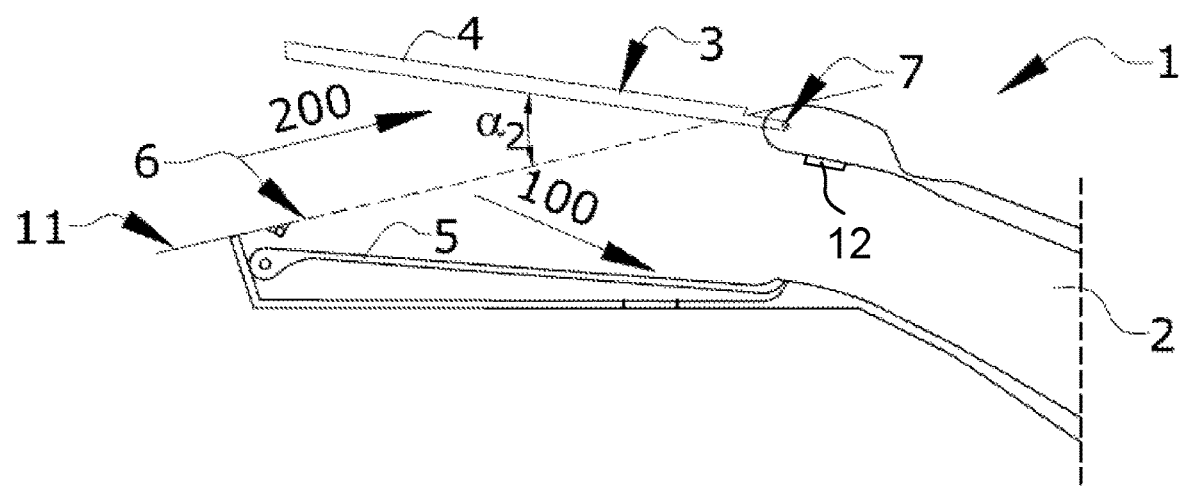
FIG. 11 shows an air intake of an aircraft according to the embodiment of FIGS. 7 to 10.

FIG. 11 schematically shows the air intake of the embodiment of FIGS. 8-10 in a scoop position. The scoop position is an opened position of the flap door (3), wherein the flap door (3) is articulated about the first end (7) and forms a second angle ($\alpha 2$) with respect to the closed position of the flap door (3). The closed position of the flap door (3) is represented in FIG. 11 with a dashed line in order to better identify the second angle ($\alpha 2$). In this embodiment the barrier filter has an anisotropic porosity and thus the portion of airflow which passes through the barrier filter depends on the direction of the external airflow (200) arriving at the barrier filter. Preferably, the second angle ($\alpha 2$) is selected such that at said orientation of the flap door (3) most of the external airflow (200) arriving at the flap door (3) is directed towards the inlet (6), whereas at an orientation of the flap door (3) corresponding to the first angle ($\alpha 1$) most of the external airflow (200) arriving at the flap door (3) passes through the barrier filter (4).

Figure 13:
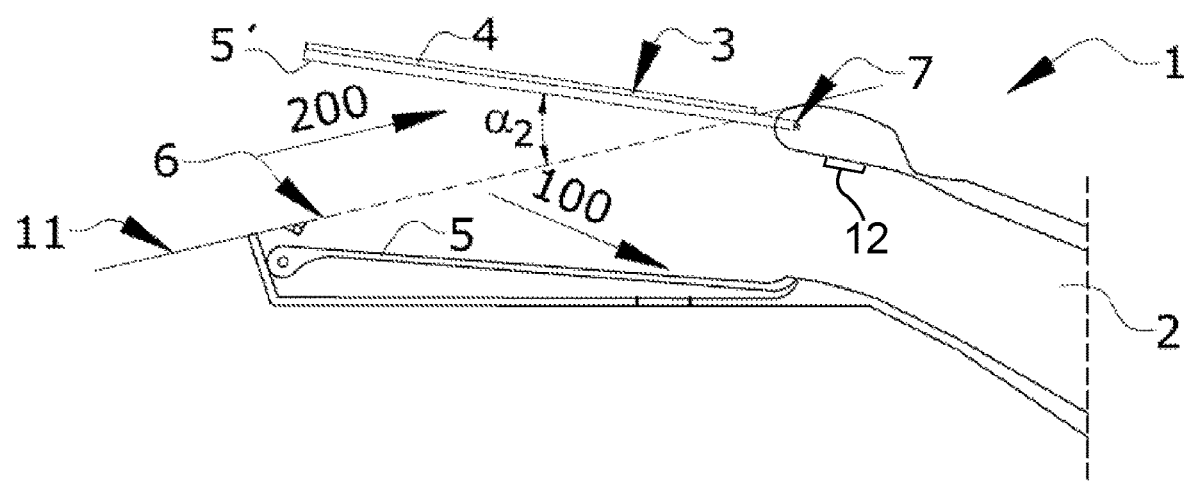
FIG. 13 shows an air intake of an aircraft according to an embodiment of the present invention.

In another embodiment, alternatively or additionally to the barrier filter having an anisotropic porosity, the air intake (1) comprises a second movable blind (5') arranged on the flap door (3). This embodiment is schematically shown in FIG. 13 in a scoop mode. In this embodiment the second movable blind (5') comprises a plurality of slats (5.1) covering the barrier filter (4), thus blocking the pass of external airflow (200) through the barrier filter (4) of the flap door (3) in the scoop mode. In this embodiment the external airflow (200) sets the slats in a position flatted against the barrier filter (4). Also, the slats can be set in this position by the actuator (13) which mechanically moves the slats. The actuator (13)

In the scoop position the external airflow (200) is guided by the flap door (3) towards inside the air duct (2) of the air intake (1), as incoming airflow (100), for example in a situation when the aircraft engine (10) is on.

In an embodiment the first angle ($\alpha 1$) is smaller than the second angle ($\alpha 2$). In other words, the position of the flap door (3) in the cleaning mode is less open than the position of the flap door (3) in the scoop mode. In other embodiments, the first angle ($\alpha 1$) may be equal to or greater than the second angle ($\alpha 2$).

The flap door (3) of the air intake (1) passes from the closed position shown in FIG. 9 to the opened positions shown in FIGS. 10 and 11 by pivoting around the first end (7) towards outside the air duct (2) and towards the rear of the aircraft (9). That is, the flap door (3) pivots towards the direction of the external airflow (200).

Figure 12:
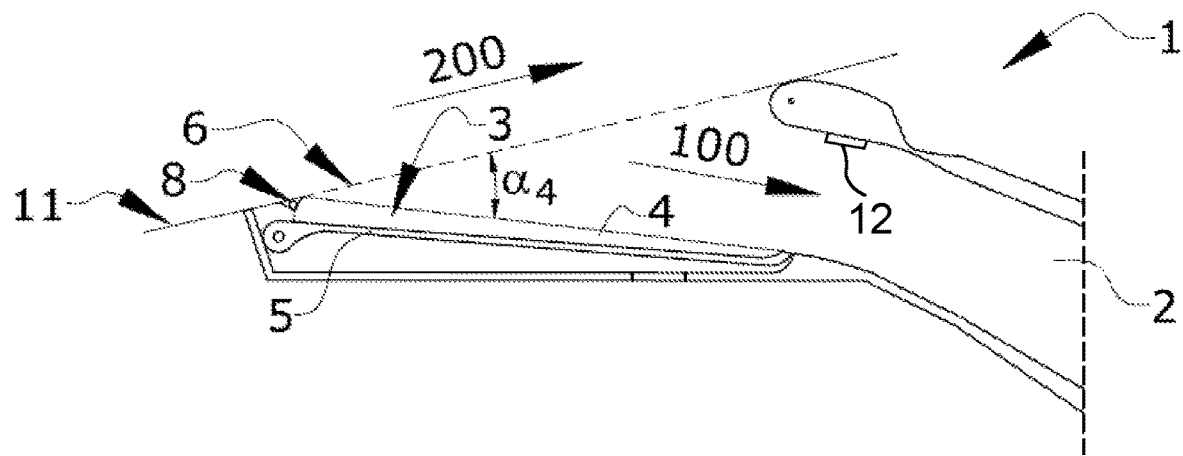
FIG. 12 shows an air intake of an aircraft according to the embodiment of FIGS. 7 to 11.

FIG. 12 schematically shows the air intake (1) of the embodiment of FIGS. 8 to 11 in a fallback position. The fallback position in FIG. 12 is a position wherein the flap door (3) is articulated about the second end (8) and is located within the air duct (2) being in contact with the movable blind (5) also hinged to the inlet (6) and located within the air duct (2). This fallback position is an opened position of the flap door (3), wherein the flap door (3), hinged in the second end (8) to the inlet (6), forms a fourth angle ($\alpha 4$) with respect to the closed position of the flap door (3) and wherein the movable blind (5) is in its blocking position. The closed position of the flap door (3) is represented in FIG. 12 with a dashed line in order to better identify the fourth angle ($\alpha 4$). Advantageously, the configuration shown in this figure avoids pressure losses or disturbance to the incoming airflow (100) thus ensuring intake performances with no impact on the external airflow (200) in flight.

In the fallback mode shown in FIG. 12, the flap door (3) is in its opened position allowing the incoming airflow (100) go through the air duct (2) without being filtered, for example in a situation when the aircraft engine (10) is on.

Figure 14:
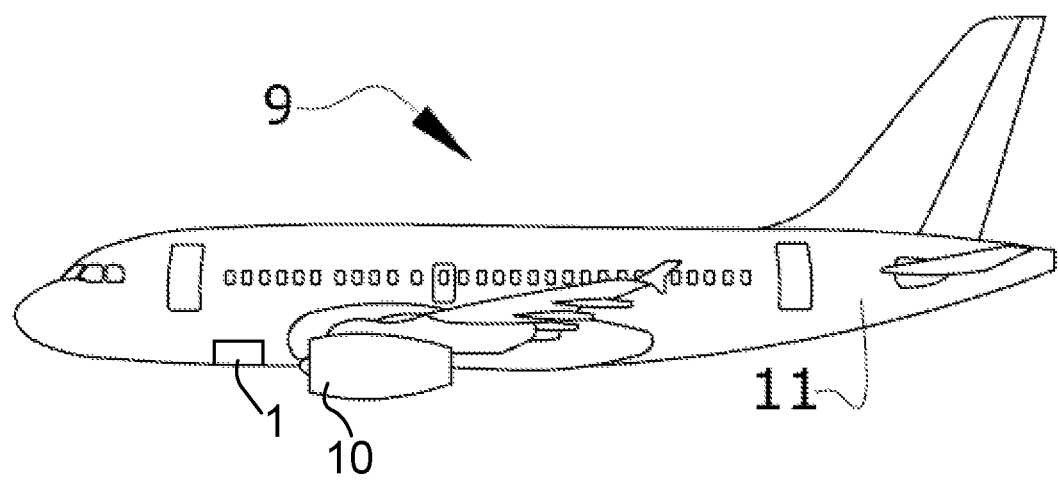
FIG. 14 shows an aircraft comprising an air intake according to an embodiment of the present invention.

In a particular embodiment, the air intake (1) is located in the tail cone of an aircraft (9) and is suitable for providing an incoming airflow (100) through an air duct (2) to the auxiliary power unit (engine) of the aircraft (9). FIG. 14 shows an aircraft (9) comprising an air intake (1), and propulsion engines (10). The air intake may be according to any of the embodiments previously defined.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. An aircraft including an air intake which comprises:
    an air duct arranged inside the aircraft,
    an inlet at an end of the air duct and adjacent an outer surface of the aircraft,
    a flap door attached to the outer surface and configured to overlap the inlet to the air duct, and
    a door driving mechanism,
    wherein:
    the air intake is configured to direct airflow entering the inlet to the inside of the aircraft,
    the flap door is hinged at a first end to the inlet,
    the door driving mechanism is configured to move the flap door between:
       a closed position wherein the flap door covers the inlet, wherein the flap door has a first side facing outward of the air duct while the flap door is in the closed position and a second side, opposite the first side, facing inward into the air duct while the flap door is in the closed position, and
       a cleaning position wherein the flap door forms a first angle ($\alpha 1$) with respect to the closed position of the flap door and the first angle ($\alpha 1$) is different from zero (0), and
       a scoop position wherein the flap door forms a second angle (a2) greater than the first angle ($\alpha 1$);
    the flap door comprises a barrier filter attached to the second side of the flap door and the barrier filter is configured to filter an incoming airflow into the air duct, at least one movable blind and an actuator configured to move the at least one movable blind between two positions which include:
       a blocking position wherein the at least one movable blind covers the barrier filter,
       and a non-blocking position wherein the at least one movable blind uncovers the barrier filter, and
    the door driving mechanism is configured to move the flap door between the closed position, the cleaning position and the scoop position by pivoting the flap door about the first end towards outside of the aircraft and towards a rear part of the aircraft,
    wherein the actuator is configured to move the at least one moveable blind to the non-blocking position in conjunction with the door driving mechanism moving the flap door to the cleaning position, and to the blocking position in conjunction with the door driving mechanism moving the flap door to the scoop position.

2. The aircraft according to claim 1, wherein the barrier filter comprises:
    a first side facing outward of the air duct while the flap door is in the closed position, and
    a second side facing inward of the air duct while the flap door is in the closed position.

3. The aircraft according to claim 1, wherein the at least one movable blind is arranged on the flap door and comprises a plurality of slats.

4. The aircraft according to claim 3, wherein each of the plurality of slats is attached at one end of the slat to the flap door.

5. The aircraft according to claim 1, further comprising at least one movable blind located one on a side of the barrier filter.

6. The aircraft according to claim 1, wherein one movable blind is hinged to the inlet.

7. The aircraft according to claim 1, wherein the door driving mechanism is configured to move the flap door to a fallback position where the flap door forms a third angle ($\alpha 3$) with respect to the closed position of the flap door, the third angle ($\alpha 3$) being different to the first angle ($\alpha 1$) and to the second angle ($\alpha 2$).

8. An aircraft including an air intake which comprises:
    an air duct arranged inside the aircraft,
    an inlet at an end of the air duct and adjacent an outer surface of the aircraft,
    a flap door attached to the outer surface and configured to overlap the inlet to the air duct, and
    a door driving mechanism,
    wherein:

the air intake is configured to direct airflow entering the inlet to the inside of the aircraft, the flap door is hinged at a first end to the inlet, the door driving mechanism is configured to move the flap door between at least two positions, wherein said at least two positions are:

a closed position wherein the flap door closes the inlet, and an opened position wherein the flap door forms an angle ($\alpha$) with respect to the closed position of the flap door and the angle ($\alpha$) is different from zero (0), the flap door comprises a barrier filter configured to filter an incoming airflow into the air duct, and the door driving mechanism is configured to move the flap door from the closed position to an opened position by pivoting the flap door about the first end towards outside of the aircraft and towards a rear part of the aircraft.

wherein the air intake comprises at least one movable blind and an actuator configured to move the at least one movable blind between two positions which include:

a blocking position wherein the at least one movable blind covers the barrier filter, and a non-blocking position wherein the at least one movable blind uncovers the barrier filter.

wherein the at least one movable blind is arranged on the flap door and comprises a plurality of slats;

wherein each slat is rotatably fixed to the flap door, such that each slat is configured to be rotated about an axis by the actuation of the actuator, wherein the barrier filter comprises a plurality of first filter portions, wherein each of the first filter portions is attached by a respective hinge to two contiguous ones of the slats and is configured to be pleated in at least two parts, and wherein rotation of the slats about the axis folds the first filter portions.

9. The aircraft according to claim 8, wherein the barrier filter comprises a plurality of second filter portions, wherein each second filter portion is configured to be pleated in at least two parts and is attached by a respective hinge to two contiguous ones of the slats at an end of the slats opposed to an end where the first filter portions are attached, and wherein the rotation of the slats about the axis folds the second filter portions.

10. An air intake assembly in an aircraft and comprising:

an air duct within the aircraft, an air inlet of the air duct adjacent an exterior surface of the aircraft;

a flap door having a first edge attached by a hinge to the aircraft, wherein the flap door has a first side facing outward of the air duct while the flap door is in a closed position covering the air inlet, and a second side, opposite the first side, facing inward into the air duct while the flap door is in the closed position;

a door driving mechanism configured to pivot the flap door about the hinge between the closed position which covers and closes the air inlet, a cleaning position at which the flap door forms a first angle ($\alpha1$) greater than zero with respect to the closed position of the flap door, and a scoop position at which the flap door forms a second angle ($\alpha2$), greater than the first angle ($\alpha1$), with respect to the closed position of the flap door;

a barrier filter attached to the second side of the flap door and configured to filter air flowing through the air inlet while the flap door is in the closed position, and a moveable blind pivotably attached to the second side of the flap door, wherein the moveable blind is configured to be moved by an actuator to an unblocking configuration which allows airflow through the flap door and the barrier filter while the flap door is in the closed position and the cleaning position, wherein the moveable blind is configured to be moved by the actuator to a blocking configuration which prevents airflow through the flap door and the barrier filter when the flap door is pivoted to the scoop position by the door driving mechanism.

11. The air intake assembly of claim 10, wherein the movable blind includes slats arranged parallel to each other, and each of the slats pivots about a respective axis to change the movable blind between the blocking configuration to prevent the airflow through the flap door and the barrier filter, and the unblocking configuration to allow the airflow through the flap door and the barrier filter.

* * * * *